(12) United States Patent
Luo

(10) Patent No.: US 9,298,708 B2
(45) Date of Patent: Mar. 29, 2016

(54) BUSINESS CARD INFORMATION EXCHANGE METHOD COMBINING CHARACTER RECOGNITION AND IMAGE MATCHING

(75) Inventor: Xiping Luo, Shanghai (CN)

(73) Assignee: INSTIG INFORMATION CO., LTD., Shanghai (CN)

( * ) Notice: Subject to any disclaimer, the term of this patent is extended or adjusted under 35 U.S.C. 154(b) by 146 days.

(21) Appl. No.: 14/126,348

(22) PCT Filed: Aug. 4, 2011

(86) PCT No.: PCT/CN2011/078018
§ 371 (c)(1),
(2), (4) Date: Dec. 13, 2013

(87) PCT Pub. No.: WO2013/004035
PCT Pub. Date: Jan. 10, 2013

(65) Prior Publication Data
US 2014/0126825 A1 May 8, 2014

(30) Foreign Application Priority Data
Jul. 5, 2011 (CN) .......................... 2011 1 0186950

(51) Int. Cl.
*G06K 9/46* (2006.01)
*G06F 17/30* (2006.01)
(Continued)

(52) U.S. Cl.
CPC ...... *G06F 17/30011* (2013.01); *G06K 9/00463* (2013.01); *G06K 9/00483* (2013.01); *G06K 9/00979* (2013.01); *G06K 9/3258* (2013.01); *G06Q 10/10* (2013.01)

(58) Field of Classification Search
USPC ................. 382/171, 187, 190, 209, 282, 305; 358/537, 538, 462
See application file for complete search history.

(56) References Cited

U.S. PATENT DOCUMENTS 5,465,353 A 11/1995 Hull et al.
6,115,495 A * 9/2000 Tachikawa et al. ........... 382/165

(Continued)

FOREIGN PATENT DOCUMENTS

CN 1413861 A 4/2003
CN 1778125 A 5/2006

(Continued)

*Primary Examiner* — Yosef Kassa
(74) *Attorney, Agent, or Firm* — Novick, Kim & Lee, PLLC; Allen Xue

(57) ABSTRACT

Provided in the present invention is a method for exchanging business card information by combining character recognition and image matching, and the method is applicable in a network system composed of a website server, a first client, and a second client. The method comprises at least: the first client uploading to the website server character information and an image feature acquired from a business card image of a second client user; the website server retrieving all the prestored business cards matched with the character information from a business card database, performing an image feature matching, then selecting a candidate business card on the basis of the similarity of the image feature, and determining if the candidate business card belongs to the second client user; if so, then after obtaining the second client' permission, the website server transmitting the business card information of the second client user to the first client, while also transmitting the business card information of the first client to the second client; and if not, then ending the procedure. This ensures the accuracy and recognition speed of exchanging business card information, and further protects the privacy of the business card owners.

9 Claims, 1 Drawing Sheet

(51) Int. Cl.
  *G06K 9/00* (2006.01)
  *G06K 9/32* (2006.01)
  *G06Q 10/10* (2012.01)

(56) References Cited

U.S. PATENT DOCUMENTS

| | | | |
|---|---|---|---|
| 6,181,820 B1 * | 1/2001 | Tachikawa et al. | 382/190 |
| 6,816,725 B1 | 11/2004 | Lemke et al. | |
| 7,347,378 B2 * | 3/2008 | Frohlich | G06K 19/10 235/487 |
| 7,428,569 B1 * | 9/2008 | Fujihara | G01C 21/3623 382/321 |
| 7,478,529 B2 * | 1/2009 | Menne et al. | 60/353 |
| 7,508,954 B2 * | 3/2009 | Lev | G06K 9/00624 380/51 |
| 8,244,037 B2 * | 8/2012 | Huang | G06F 17/30011 382/100 |
| 2006/0027648 A1 | 2/2006 | Cheah | |
| 2007/0158403 A1 | 7/2007 | Ertas | |
| 2008/0134030 A1 | 6/2008 | Kansal et al. | |
| 2008/0194203 A1 | 8/2008 | Hong | |
| 2009/0181653 A1 | 7/2009 | Alharayeri | |
| 2010/0255861 A1 | 10/2010 | Raviv et al. | |
| 2010/0323729 A1 | 12/2010 | Chitsey et al. | |

FOREIGN PATENT DOCUMENTS

| | | |
|---|---|---|
| CN | 1964331 A | 5/2007 |
| CN | 101827317 A | 9/2010 |
| CN | 101882227 A | 11/2010 |
| CN | 101916258 A | 12/2010 |
| EP | 1796019 A1 | 6/2007 |
| JP | 2002269221 A | 9/2002 |
| JP | 2009043075 A | 2/2009 |
| JP | 2011095889 A | 5/2011 |

* cited by examiner

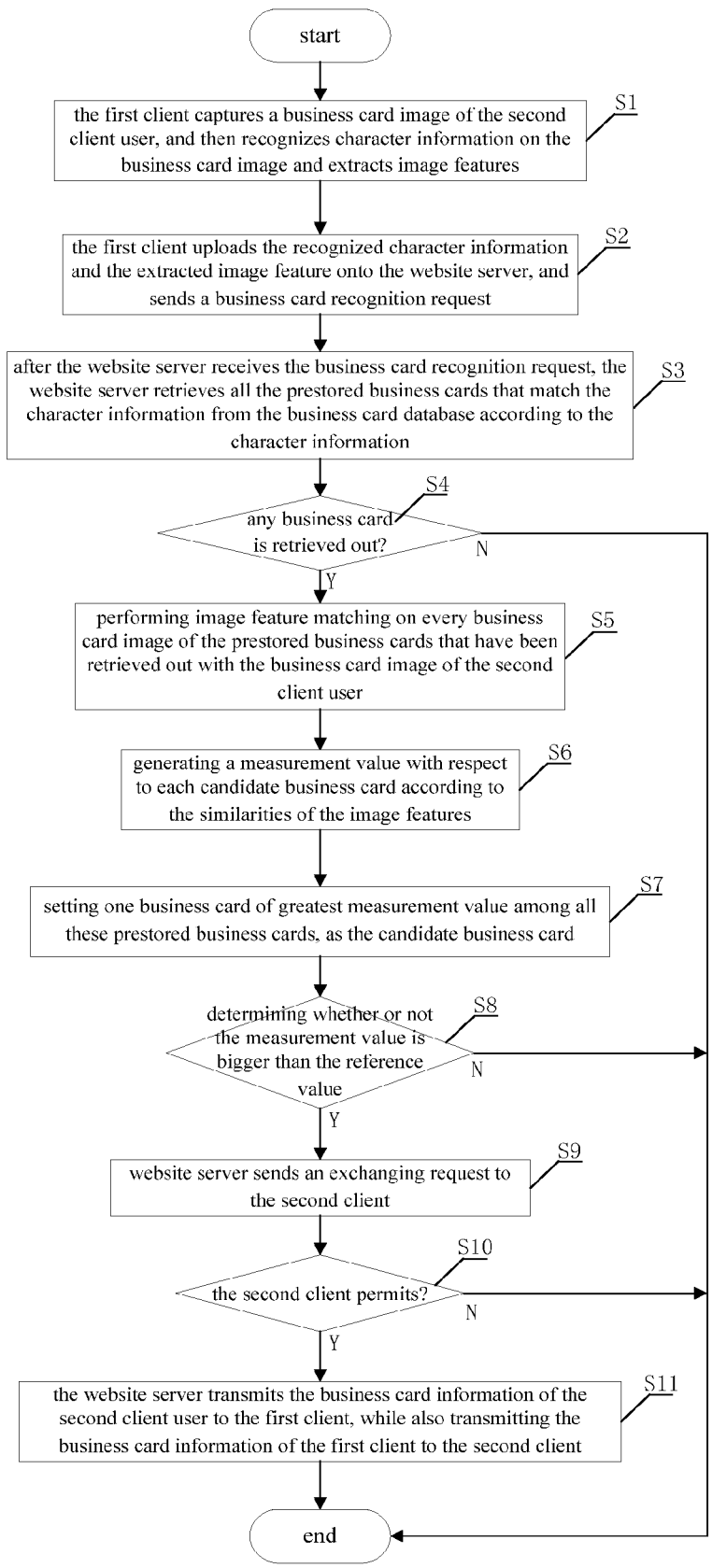

BUSINESS CARD INFORMATION EXCHANGE METHOD COMBINING CHARACTER RECOGNITION AND IMAGE MATCHING

FIELD OF THE INVENTION

This invention relates to the technical field of image processing and that of network application, and especially to a method for determining business card owners and exchanging business card information by combining character recognition and image matching.

DESCRIPTION OF THE RELATED ART

Business card is a medium that people usually use to carry and deliver contact information. A lot of business cards are exchanged in daily business activities, and people communicate contact information by exchanging business cards, so as to establish communication with others.

Nowadays, the business card recognition technology widely used in cellphones and microcomputers, which uses the principles of image processing and optical character recognition (OCR, Optical Character Recognition) to automatically process and recognize the business card image obtained by a digital photography device or a scanner device and then automatically extracts some useful information such as name, telephone number, E-mail and so on therefrom so as to add such information into the address book, brings great convenience for those people who want to input the contact information recorded in the business card into an electronic apparatus. For example, Touch Diamond cellphone provided by the Dopod is previously installed with business card recognition software.

In an example of the existing business card recognition application, if user A and user B exchange their business cards, they individually need to add the business card information of the other into a contact list of his/her own electronic apparatus manually or by using the business card recognition software.

Characters obtained by recognizing the business card can be delivered to a server of a website, and the character information in the recognized business card (for example, name, telephone number, email address and the like) is used to find out the business card owner from registered users of the website, so that the business card owner can exchange the electronic business card information. However, the recognition result of the business card recognition technology based on the principle of optical character recognition cannot be 100% accurate. If the character information which is obtained by optical character recognition that might contain some errors is delivered to the server of the website, in many cases, the server of the website cannot exclusively determine who is the registered user that saves the business card to which those characters belong, and cannot determine whether or not those characters belong to the business card saved by the registered user of the website according to characters obtained by optical character recognition. For example, the business cards of some salesmen in the same company, except for the name, are the same in terms of other information such as company name, address, telephone number, email address; at this time, if characters of the name in the business card are not recognized, then the server of the website cannot determine who the owner of this business card is according to those other character information.

The so-called image matching refers to determining whether or not objects shot in two images are the same. The image matching has been researched for many years in the academic circle; and the usual measure is to find out some feature points of objects shot in those images, and then a feature vector is obtained according to pixel values within a certain range around these feature points. Determining whether or not objects shot in those images are the same is made by performing matching with respect to the feature points and the feature vector; for example, a thesis of "Speed-up Robust Feature (SURF)" (Herbert Bay, Andreas Ess, Tinne Tuytelaars, Luc Van Gool, Computer Vision and Image Understanding 110 (2008) 346-359) describes one of such methods in detail; while another academic dissertation titled "Rate-efficient, real-time cd cover recognition on a camera-phone" (Sam S. Tsai, David Chen, Jatinder Pal Singh, Bernd Girod, Proceeding of the 16th ACM international conference on Multimedia) describes a practical system for finding out a CD cover that most resembles an inputted image, from 10000 images of CD covers stored in a database, by means of image matching.

As for applying a method of image matching to the business card recognition, a simple and obvious way is to extract feature points with respect to each of the business card image that is delivered to the website server and is required to be subject to recognition in order to obtain characters contained therein, and then use a certain image matching algorithm to find out the business card that most resembles the inputted business card image from all the business card images contained in the server, so that the character information of such business card is fed back to the user. However, such measure has some major problems as follows:

First, the speed of image matching method is too slow. Since the database of the server stores a huge number of business card images, usually, it is possible that the business card that is same as the inputted image is found out from several millions, or tens of millions, or even hundreds of millions of different business card images; on the other hand, in practical applications, the server of the website may need to process hundreds of thousands or even several millions of requests to recognize the business card every day, and the existing computing hardware and image matching algorithm can barely finish such workload.

Second, the accuracy of the image matching method is not high enough. A business card contains name, telephone number, email address, address, company name and job title and the like of the user, which are all highly private information. If the user request to recognize one business card, and the server of the website feeds back the character information corresponding to another business card, the privacy of the business card owner that is fed back is infringed. Therefore, business card recognition that uses the image matching method requires recognition accuracy of 100%. The term "recognition accuracy" used here refers to how many times out of 100 recognition requests the server of the website feeds back character information that is exactly the character information contained in the business card image to be recognized. However, provided that the recognition accuracy is guaranteed, the recognition fail rate needs to be kept as low as possible; otherwise, such business card recognition loses its value of practical usage. The term "recognition fail rate" used here refers to how many times out of 100 business card recognition requests sent to the server of the website the server of the website informs that it is not recognizable. The reason why it is not recognizable may be that the server of the website does not keep the image and corresponding character information of the business card shot in the submitted image. Or, it may be that the server of the website cannot make sure which business card is shot in the submitted image, and thus the server of the website refuses to feed back corresponding character information. The existing image matching algorithm seeks to guarantee an accuracy of 100%. Nevertheless, its recognition fail rate is usually high.

Therefore, how to provide a business card information exchanging technology that combines character recognition and image matching so as to solve problems in the prior art has become an urgent problem that practitioners in this technical field want to address.

SUMMARY OF THE INVENTION

In view of above deficiencies in the prior art, an object of the invention is to provide a method for exchanging business card information by combining character recognition and image matching, for ensuring the accuracy and recognition speed of exchanging business card information, and further protecting the privacy of the business card information.

In order to realize above object and other relevant objects, the invention provides a method for exchanging business card information by combining character recognition and image matching, and the method is applicable in a network system at least composed of a website server, a first client, and a second client; the website server has a business card database that prestores business card information; the first and the second clients have functions of capturing business card images, recognizing character information and extracting image features, characterized in that, the method for exchanging business card information comprises at least the following steps: 1) the first client captures a business card image of the second client user, and then recognizes character information on the business card image and extracts image features; 2) the first client uploads the recognized character information and the extracted image feature onto the website server, and sends a business card recognition request; 3) after the website server receives the business card recognition request, the website server retrieves all the prestored business cards that match the character information from the business card database according to the character information, respectively performs image feature matching on every business card image of the prestored business cards that have been retrieved with the business card image of the second client user, and generates a measurement value representative of the degree of similarity with respect to each candidate business card according to the similarities of the image features; 4) the website server sets one business card of greatest measurement value among all these prestored business cards, as the candidate business card; 5) whether or not the candidate business card belongs to the second client user is determined; and if it does, the website server sends an exchanging request to the second client, and after the second client permits, the website server transmits the business card information of the second client user to the first client, while also transmitting the business card information of the first client to the second client; if not, the procedure ends.

In the method for exchanging business card information of the invention, the business card information comprises the business card image, the character information, and image, audio or video information of the business card owner. The character information includes at least one of: name, professional title, telephone number, fax number, address, post code, email address, website address, and product information on the business card.

In the step 1) of the method for exchanging business card information of the invention, the first client captures the business card image of the second client user by means of a digital photography device or a scanner device. The first client recognizes the character information on the business card image and extracts the image feature by means of optical character recognition technology.

In the method for exchanging business card information of the invention, the website server presets a reference value for comparison with the measurement value, and the measurement value and the reference value are both integers; in the step 5), when the website server determines whether or not the candidate business card belongs to the second client user, whether or not the measurement value is bigger than the reference value is determined, and if the answer is yes, the website server sends the exchanging request to the second client, if not, the procedure ends.

In the step 3) of the method for exchanging business card information of the invention, after the website server receives the business card recognition request, if prestored business cards that match the character information cannot be retrieved from the business card database according to the character information, the procedure ends. The image feature matching refers to performing matching on feature points and feature vectors corresponding to each feature point with respect to the business card image of the prestored business cards and the business card image of the second client user.

In the step 5) of the method for exchanging business card information of the invention, the website server sends the exchanging request to the second client, and when the second client prohibits, the procedure ends. When the website server transmits the business card information of the first client to the second client, the website server registers the business card information of the first client in the website server at the same time, and keeps it in the business card database.

As described above, in the method for exchanging business card information by combining character recognition and image matching, when the business card image is recognized, the result of character recognition is combined with the image feature in order to determine which registered user of the website is the owner of the business card, and the business card information is exchanged with the business card owner; thus, both persons who exchange their paper business cards can obtain the other's electronic business card information simply by one of them taking a picture of the business card and then performing recognition, which not only ensures the accuracy and recognition speed of exchanging the business card information but also protects the privacy of the business card information by further confirmation of image matching.

BRIEF DESCRIPTION OF THE DRAWINGS

FIG. 1 is a flow chart of the method for exchanging business card information by combining character recognition and image matching of the invention.

DETAILED DESCRIPTION OF THE PREFERRED EMBODIMENTS

In the following, implementations of the invention will be described in combination with some specific embodiments, and a person skilled in the art can easily understand other advantages and effects of the invention through the contents disclosed in this Description. The invention can be implemented and applied in some other different embodiments; and modifications and alternatives can be made without departing from the spirit of the invention, to respective item of the details disclosed in this Description, based on different point of views and different applications.

Referring to FIG. 1, which is a flow chart of the method for exchanging business card information by combining character recognition and image matching of the invention, it should be noted that, illustrations provided in the present embodiment only schematically explain the basic concept of the invention, and every FIGURE only shows the elements related to the invention and is not drawn according to the number, shape and size of the elements when the invention is practiced. The pattern, type and scale of respective element might be arbitrarily changed when the invention is practiced, and the layout of the elements may be more complicated.

As shown in the FIGURE, the invention provides a method for exchanging business card information by combining character recognition and image matching, which is applicable in a network system at least composed of the website server (not shown in the FIGURE), the first client and the second client (not shown in the FIGURE). The website server has a business card database that prestores business card information; in the present embodiment, the business card information in the business card database comprises the business card image, the character information, and image, audio or video information of the business card owner; for example, it comprises an image of the user business card, a head image of the user, and information such as texts, images, audio, video and so on that the user plans to provide to other people. Wherein, the character information includes at least one of: name, professional title, telephone number, fax number, address, post code, email address, website address, and product information on the business card.

The first and the second clients have functions of capturing business card images, recognizing character information and extracting image features; and in the present embodiment, the first client has a digital photography device or a scanner device for capturing the business card image, and optical character recognition technology can be used to recognize the character information on the business card image and to extract the image feature.

In the present embodiment, the website to which the website server belongs is a website capable of maintaining contact information. Registered users of the website can put the business card information (including the character information and the business card image) of one or more of their own business cards together so as to store it into the business card database, and associate it with their own account. The stored character information of the business card is checked and corrected by the users themselves or the administrators of the website, and is guaranteed to be true. With respect to the same character information, one or more business card images may be correspondingly stored; for example, the same user may have multiple business cards, and among these business cards, only information about company name and job title is different, and other information such as name, telephone number, email address and so on are the same.

As shown in FIG. 1, the method for exchanging business card information comprises at least the following steps:

First of all, step S1 is performed, wherein the first client captures a business card image of the second client user, and then recognizes character information on the business card image and extracts image features; in the present embodiment, the first client captures the business card image of the second client user by means of a digital photography device or a scanner device, and applies optical character recognition technology to recognize the character information on the business card image and to extract the image feature. Then, step S2 is performed.

In step S2, the first client uploads the recognized character information and the extracted image feature onto the website server via a wired or wireless network, and issues a business card recognition request. Then, step S3 is performed.

In step S3, after the website server receives the business card recognition request, the website server retrieves all the prestored business cards that match the character information from the business card database according to the character information; in the present embodiment, the website server uses the recognized character information to retrieve from the character information of the business card stored by the registered user of the website. The purpose of character retrieval is to significantly reduce the number of images required for performing the image matching according to the image feature in the next step, so as to enhance the speed and matching accuracy of the image matching. The character retrieval that uses the recognized character information may specifically refer to retrieving out prestored business cards that are exactly the same as the recognized characters in terms of at least one of name, professional title, telephone number, fax number, address, post code, email address, website address, and product information of the recognized characters, from the character information of the business card stored in the business card database by the registered user of the website. Then, step S4 is performed.

In step S4, it is determined whether or not a business card is retrieved, if so, the procedure proceeds to step S5, and if not, then it means that the business card information of the second client user is not registered in such website, in other words, the business card information of the second client user is not contained in the business card database, thus, the procedure directly ends.

It should be noted that, even if the result obtained after retrieving from the business card database by the recognized character information in step S4 includes only one business card that is consistent with the characters recognized from the business card image of the second client user, such business card still needs to be checked in step S5, because in some cases, the website server cannot definitely determine which business card stored by the website server the character obtained by optical character recognition belong to, and cannot determine whether or not the character obtained by optical character recognition belongs to the business cards stored by the website server. For example, one user may have multiple business cards, and among these business cards, only information about company name and job title is different, and other information such as name, telephone number, email address and so on are the same; in such case, if errors occur during the recognition of company name and job title, and only information such as name, telephone number, email address and so on are correctly recognized, the website server cannot exclusively determine which of the business card those information belongs to. Then, step S5 is performed.

In step S5, image feature matching is performed on the business card image of every prestored business cards that have been retrieved respectively with the business card image of the second client user; in the present embodiment, the image feature matching refers to performing matching on the feature point and feature vector corresponding to each feature point with respect to the business card image of the prestored business cards and the business card image of the second client user.

In step S6, a measurement value representative of the degree of similarity is generated with respect to each candidate business card, according to the similarities of the image features; in the present embodiment, the website server presets a reference value for comparison with the measurement value, and the measurement value and the reference value are both integers; when a measurement value is bigger than the reference value, then it means that such candidate business card that corresponds to that measurement value is a business card of the second client user. In other words, the bigger the measurement value, the more similar such candidate business card that corresponds to that measurement value and the business card of the second client user will be. Then, step S7 is performed.

In step S7, the website server sets one business card of greatest measurement value among all these prestored business cards as the candidate business card so as to ensure the accuracy of the comparison to be performed in the next step. Then, step S8 is performed.

In step S8, it is determined whether or not the candidate business card belongs to the second client user. In other words, when the website server determines whether or not the candidate business card belongs to the second client user, it is determined whether or not the measurement value is bigger than the reference value; if it is, the procedure proceeds to step S9, and if not, then it means that the candidate business card does not belong to the second client user, in which case the business card information will not be exchanged in order to prevent the privacy of information of the second client user from leaking out, thus, the procedure directly ends.

In step S9, the website server sends an exchanging request to the second client. Then, step S10 is performed.

In step S10, it is determined whether or not the second client permits the exchanging request; if the answer is yes, the procedure proceeds to step S11, and if the answer is no, then it means that the user of the second client does not want to exchange business card information with the user of the first client, in which case the business card information will not be exchanged in order to prevent the privacy of information of the second client user from leaking out, thus, the procedure directly ends.

In step S11, the website server transmits the business card information of the second client user to the first client, and meanwhile also transmits the business card information of the first client to the second client; at this time, if the user of the first client fails to register his/her business card information into the website, while the first client transmits his/her business card information to the second client, the first client can also register it into the website server and store it into the business card database, so that when the business card information are exchanged in the future, his/her business card information can be obtained by the client of those who exchange the business card information.

In summary, in the method for exchanging business card information by combining character recognition and image matching of the invention, when the business card image is recognized, the result of character recognition is combined with the image feature in order to determine which registered user of the website is the owner of the business card, and the business card information is exchanged with the business card owner; thus, both persons who exchange their papery business cards can obtain the other's electronic business card information simply by one of them taking a picture of the business card and then performing recognition, which not only ensures the accuracy and recognition speed of exchanging the business card information, but also protects the privacy of the business card information by further confirmation of image matching. Therefore, the invention overcomes the disadvantages of the prior art, and is highly valuable for industrial applications.

The embodiments described above are only used to illustrate the principle and effects of the invention rather than to limit the invention. As for a person skilled in the art, modifications and alternatives can be made without departing from the spirit and scope of the invention. Thus, all the modifications and alternatives that those skilled in the art can envisage without departing from the spirit and the technical concept of technologies as disclosed in the invention should be considered as being covered by the claims.

The invention claimed is:

1. A method for exchanging business card information by combining character recognition and image matching, wherein the method is applicable in a network system comprising at least a website server, a first client, and a second client; wherein the website server comprises a business card database that prestores business card information; the first and the second clients have functions of capturing business card images, recognizing character information and extracting image features, the method comprising:
   1) the first client capturing a business card image of the second client user, and then recognizing character information on the business card image and extracts image features;
   2) the first client uploading a recognized character information and an extracted image feature onto the website server, and sending a business card recognition request;
   3) the website server receiving the business card recognition request, thereafter retrieving the prestored business cards that match the character information from the business card database according to the recognized character information, performing image feature matching on every business card image of the prestored business cards that have been retrieved with the business card image of the second client user, and generating a measurement value representative of a degree of similarity with respect to each candidate business card according to the similarities of the image features;
   4) the website server assigning one business card having the highest measurement value as the candidate business card;
   5) determining whether or not the candidate business card belongs to the second client user; and if so, the website server sending an exchanging request to the second client, and after receiving permission from the second client, the website server transmitting the business card information of the second client user to the first client, while also transmitting the business card information of the first client to the second client,
   wherein the business card information comprises the business card image, the character information, and image, audio or video information of the business card owner.

2. The method for exchanging business card information by combining character recognition and image matching according to claim 1, characterized in that: the character information comprises at least one of: name, professional title, telephone number, fax number, address, post code, email address, website address, and product information on the business card.

3. The method for exchanging business card information by combining character recognition and image matching according to claim 1, characterized in that: in the step 1), the first client captures the business card image of the second client user by means of a digital photography device or a scanner device.

4. The method for exchanging business card information by combining character recognition and image matching according to claim 1, characterized in that: in the step 1), the first client recognizes the character information on the business card image and extracts the image feature, by means of optical character recognition technology.

5. The method for exchanging business card information by combining character recognition and image matching according to claim 1, characterized in that: the website server presets a reference value for comparison with the measurement value, and the measurement value and the reference value are both integers; in step 5), when the website server determines whether or not the candidate business card belongs to the second client user, whether or not the measurement value is bigger than the reference value is determined, and if so, the website server sends the exchanging request to the second client, if not, the procedure ends.

6. The method for exchanging business card information by combining character recognition and image matching according to claim 1, characterized in that: in step 3), after the website server receives the business card recognition request, if prestored business cards that match the character information cannot be retrieved from the business card database according to the character information, the procedure ends.

7. The method for exchanging business card information by combining character recognition and image matching according to claim 1, characterized in that: in the step 3), the image feature matching refers to performing matching on feature points and feature vectors corresponding to each feature point with respect to the business card image of the prestored business cards and the business card image of the second client user.

8. The method for exchanging business card information by combining character recognition and image matching according to claim 1, characterized in that: in the step 5), the website server sends the exchanging request to the second client, and when the second client prohibits, the procedure ends.

9. The method for exchanging business card information by combining character recognition and image matching according to claim 1, characterized in that: in the step 5), when the website server transmits the business card information of the first client to the second client, the website server registers the business card information of the first client in the website server at the same time, and keeps it in the business card database.

* * * * *